US 11,275,240 B2

(12) United States Patent
Tanaka (10) Patent No.: US 11,275,240 B2
(45) Date of Patent: Mar. 15, 2022

(54) IMAGE DISPLAY DEVICE (71) Applicant: Shimadzu Corporation, Kyoto (JP)

(72) Inventor: Masato Tanaka, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/059,383

(22) PCT Filed: Jun. 11, 2018

(86) PCT No.: PCT/JP2018/022269
§ 371 (c)(1),
(2) Date: Nov. 27, 2020

(87) PCT Pub. No.: WO2019/239465
PCT Pub. Date: Dec. 19, 2019

(65) Prior Publication Data
US 2021/0278664 A1 Sep. 9, 2021

(51) Int. Cl.
*G02B 27/01* (2006.01)

(52) U.S. Cl.
CPC .. *G02B 27/0101* (2013.01); *G02B 2027/0181* (2013.01); *G02B 2027/0187* (2013.01)

(58) Field of Classification Search
CPC ...... G02B 2027/0125; G02B 2027/013; G02B 2027/0161; G02B 2027/0181;
(Continued)

(56) References Cited

U.S. PATENT DOCUMENTS 4,647,142 A * 3/1987 Boot .................. G02B 27/0103
345/7
5,278,696 A * 1/1994 Suvada .............. G02B 27/0101
359/629

(Continued)

FOREIGN PATENT DOCUMENTS

JP          4508655 B2    5/2010
JP       2015-118223 A    6/2015
(Continued)

OTHER PUBLICATIONS

First Japanese Office Action dated Oct. 19, 2021 issued for corresponding Japanese Patent Application No. 2020-524966, submitted with a machine translation.
Extended European Search Report dated May 28, 2021 for the corresponding European Patent Application No. 18922889.3.
Written Opinion of the International Searching Authority (ISA237) for PCT application PCT/JP2018/022269, dated Aug. 28, 2018, submitted with a machine translation.

*Primary Examiner* — Ram A Mistry
(74) *Attorney, Agent, or Firm* — Muir Patent Law, PLLC (57) ABSTRACT Image light that travels between opposed parallel surfaces (100a, 100b) of the light guide (10) while being reflected by the opposed parallel surfaces is partially reflected by the outgoing-side reflection surfaces (102a, 102b) of a beam splitter. The image light took out from the light guide (10) is partially reflected by the two combiners (14, 15) and advances towards eyes of a user (E). The distance D of the combiners (14, 15) is set to be equal to or larger than A1/(2 cos θ·tan θ) and equal to or smaller than A2/(2 cos θ·tan θ), where θ is an incident angle θ of the image light to the combiner (14, 15), A1 is a light flux width of the image light reflected by one outgoing-side reflection surface, and A2 is a light flux width of the image light emitted from all of the outgoing-side reflection surfaces. This makes it possible to reduce the overlapping of images formed when viewed from the user, avoid the generation of partial image omission, and improve visibility.

2 Claims, 4 Drawing Sheets (58) Field of Classification Search
CPC ........ G02B 2027/0187; G02B 27/0081; G02B 27/0101; G02B 27/0172
See application file for complete search history.

(56) References Cited

U.S. PATENT DOCUMENTS

| | | | |
|---|---|---|---|
| 2002/0048058 A1* | 4/2002 | Nishikawa | G02B 27/0018 359/15 |
| 2005/0012682 A1* | 1/2005 | Jenson | G02B 27/0101 345/7 |
| 2005/0180687 A1 | 8/2005 | Amitai | |
| 2017/0371155 A1* | 12/2017 | Kamiya | G02B 27/0101 |
| 2019/0020868 A1* | 1/2019 | Wei | H04N 13/398 |

FOREIGN PATENT DOCUMENTS

| | | |
|---|---|---|
| JP | 2016-224464 A | 12/2016 |
| WO | 2003/081320 A1 | 10/2003 |

\* cited by examiner

IMAGE DISPLAY DEVICE

TECHNICAL FIELD

The present invention relates to an image display device for displaying image information in front of eyes of a user as a virtual image, and more particularly to an image display device suitable for a head-up display for use in airplanes and the like.

BACKGROUND ART

In various types of airplanes, a head-up display has been widely used in which a virtual image of a display image is formed in front of eyes of a pilot such that the virtual image is superimposed on the forward-view information by projecting an image displayed on a display element onto a combiner to cause the virtual image to be reflected by the combiner toward the pilot. Also in vehicles and trains, a head-up display having a similar configuration is used in some cases.

Figure 5:
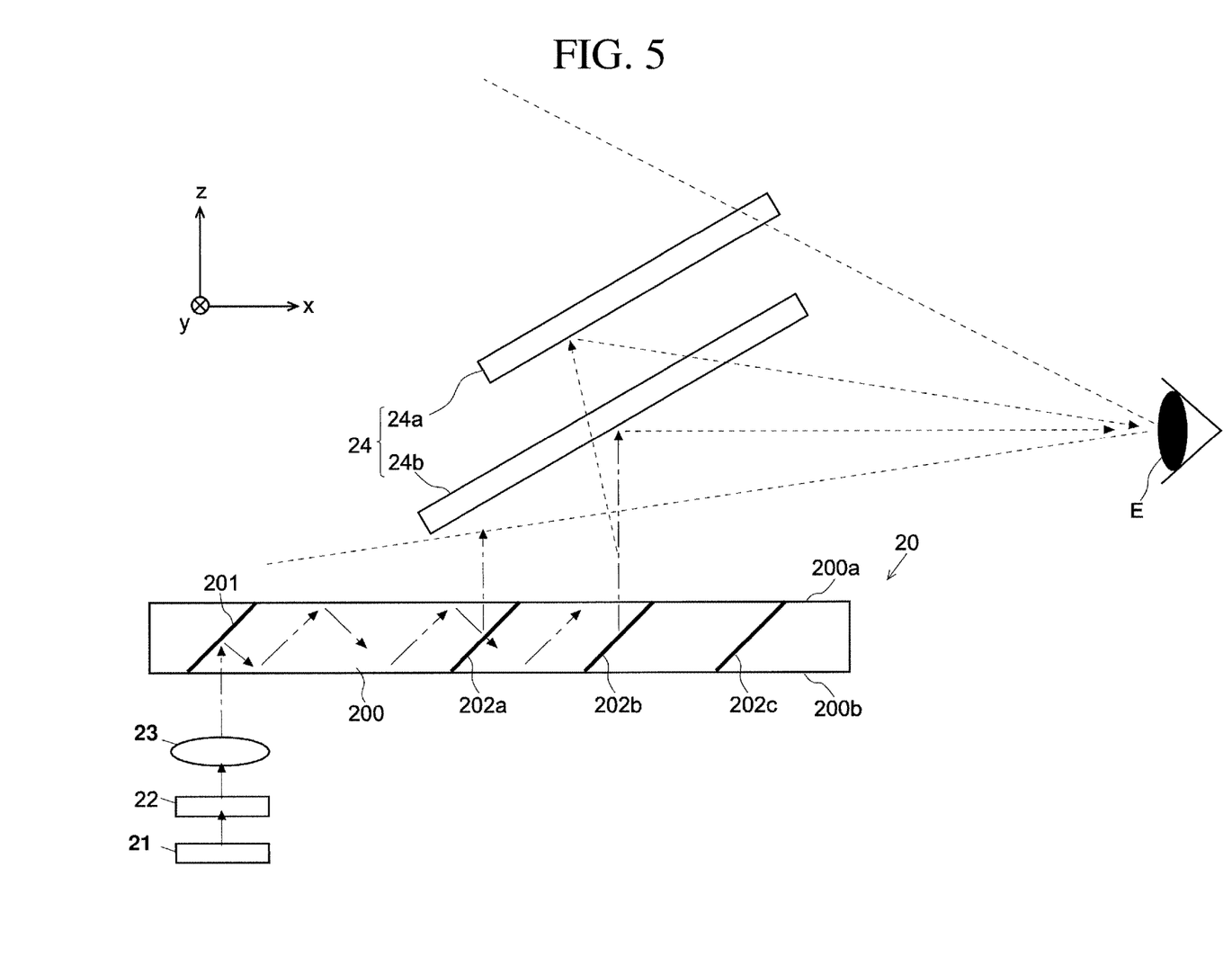
FIG. 5 is a schematic configuration diagram of an optical system in a conventional image display device.

As such a head-up display (hereinafter, abbreviated as "HUD" according to conventional practice), a device in which a light guide (light guide plate) and a plurality of combiners are used is known. FIG. 5 is a schematic diagram of a main part of a conventional HUD disclosed in Patent Document 1, focusing on an optical path configuration. For the convenience of description, three axes x, y, and z orthogonal to each other are defined as shown in the drawings. The x-axis is an axis parallel to a direction of a standard line of sight when a user views an image. The y-axis is an axis parallel to a line connecting both eyes of the user. The z-axis is an axis perpendicular to both the x-axis and the y-axis. Generally, the x-axis and y-axis are parallel to the ground, and the z-axis is perpendicular to the ground.

The HUD is provided with a light source 21, a display element 22, a collimating optical system 23, a light guide 20, and a combiner 24. The combiner 24 is arranged in front of eyes E of a user. In this example, the display element 22 is a transmissive liquid crystal display element, and the light source 21 is a backlight light source for a so-called transmissive liquid crystal display element. The light emitted from the light source 21 illuminates the display element 22 from the rear side, so that the light including an image (hereinafter referred to as "image light") formed on the display surface of the display element 22 as information is emitted from the display element 22. The collimating optical system 23 introduces the image light emitted from the respective portions (pixels) of the display surface of the display element 22 as substantially parallel light fluxes to the light guide 20. Accordingly, the light introduced from the collimating optical system 23 to the light guide 20 is a set of parallel light fluxes that contain information on different portions of the image formed on the display surface of the display element 22 and are incident on the light guide 20 at different angles.

The light guide 20 is provided with a flat cube-shaped transparent substrate 200 having a first surface 200a and a second surface 200b opposed in parallel to the x-y plane, and a third surface and a fourth surface (not shown) opposed in parallel to the x-z plane. A single incident-side reflection surface 201 and a plurality (three in this case) of outgoing-side reflection surfaces 202a to 202c are formed in the inside of the substrate 200. The incident-side reflection surface 201 is perpendicular to the third surface and the fourth surface and is inclined with respect to the first surface 200a and the second surface 200b. The plurality of outgoing-side reflection surfaces 202a to 202c, like the incident-side reflection surface 201, is perpendicular to the third surface and the fourth surface and is inclined with respect to the first surface 200a and the second surface 200b, and they are parallel to each other. In this example, the incident-side reflection surface 201 is a reflection surface by a mirror or the like, and the outgoing-side reflection surfaces 202a to 202c each are a partial reflection surface having a predetermined reflectance (i.e., transmission), i.e., a beam splitter (or a half mirror) (see, for example, Patent Document 2).

As described above, the image light including the information on the different portions of the image formed on the display surface of the display element 22 enters the light guide 20 at different angles as parallel light fluxes and is reflected by the incident-side reflection surface 201. The light flux is transmitted through the inside of the substrate 200 while being repeatedly reflected by the second surface 200b and the first surface 200a and reaches the outgoing-side reflection surface 202a. The outgoing-side reflection surface 202a reflects a part of the arrived image light and transmits the remainder. The transmitted image light reaches the subsequent outgoing-side reflection surface 202b and the part of which is reflected by the outgoing-side reflection surface 202b and the remainder is transmitted therethrough. The outgoing-side reflection surface 202c similarly reflects a part of the light and transmits the remainder. Therefore, a part of the image light transmitted through the inside of the substrate 200 of the light guide 20 is reflected by the respective plurality of outgoing-side reflection surfaces 202a to 202c and is transmitted through the first surface 200a of the substrate 200 to be emitted to the outside.

The combiner 24 is composed of two plate-like members 24a and 24b arranged in parallel to each other so as to be spaced away from each other by a predetermined distance, and is inclined at a predetermined angle with respect to the first surface 200a of the light guide 20, that is inclined at a predetermined angle with respect to the x-y plane. The plate-like members 24a and 24b are both beam splitters (half mirrors). Therefore, as described above, the image light reflected by each of the outgoing-side reflection surfaces 202a to 202c of the light guide 20 and transmitted through the first surface 200a of the substrate 200 is partially reflected by each of the plate-like members 24a and 24b of the combiner 24 and reaches the eyes E of the user. In this manner, in the HUD, the image formed on the display surface of the display element 22 is displayed in front of the eyes of the user as a virtual image. Further, a part of the light based on the forward view information such as the scenery in front of the user is transmitted through the combiner 24 and reaches the eyes E of the user. As a result, the user can also visually recognize the front visual field information.

PRIOR ART DOCUMENT

Patent Document

Patent Document 1: Japanese Unexamined Patent Application Publication No. 2015-118223
Patent Document 2: Japanese Patent No. 4508655

SUMMARY OF THE INVENTION

Problems to be Solved by the Invention

As described above, by combining a light guide and a combiner including a plurality of plate-like members, the display surface size of the HUD can be increased. However, depending on the distance between the plate-like members of the combiner, i.e., the distance between the beam splitter surfaces, missing occurs in the display image as a virtual image. Conversely, when the image light reflected by the different outgoing-side reflection surfaces of the light guide overlaps excessively, the visibility of the image may be deteriorated. These have not been particularly considered in a conventional HUD.

The present invention has been made to solve the above-described problems, and the main object thereof is to enhance the visibility of a display image, which is a virtual image, in an image display device using a light guide and a combiner.

Means for Solving the Problem

The present invention made to solve the above-described problems relates to an image display device for displaying a virtual image in front of eyes of a user. The image display device includes:
  a) an image emitting unit configured to cause parallel light fluxes to be incident on a light guide described below, the parallel light fluxes including two-dimensional image information different in an angle at each part on an image;
  b) the light guide including a transparent substrate, an incident portion, and a plurality of emitting portions, wherein the transparent substrate has a first surface and a second surface opposed in parallel to each other, the incident portion is configured to guide image light incident from the image emitting unit to an inside of the substrate so as to be totally reflected by the first surface and the second surface, and the plurality of emitting portions is arranged along an overall propagation direction of the image light in the substrate to emit a part of the image light guided from the incident portion to an inside of the substrate and propagated in the substrate while being totally reflected by the first surface and the second surface to an outside of the substrate through either the first surface or the second surface; and
  c) a plurality of flat plate-like combiners disposed at positions where the image light emitted from the plurality of emitting portions of the light guide reaches, the positions being in front of the eyes of the user, and the plurality of flat plate-like combiners being configured to reflect a part of the image light emitted from the plurality of emitting portions to guide the part of the image light to the eyes of the user,
  wherein the plurality of combiners is arranged in parallel to each other so as to be spaced apart from each other in a traveling direction of the image light from the light guide, and
  wherein a separation distance between the plurality of combiners is set to
  fall within a range in which a plurality of images formed by the image light emitted from the same emitting portion of the light guide and reflected by combiners different from each other to reach the eyes of the user is not superimposed and that edges of a plurality of images formed by image light emitted from the different emitting portions of the light guide and reflected by the combiners different from each other to reach the eyes of the user coincide or parts of the plurality of images are superimposed.

The range of the separation distance between the combiners according to the present invention can be more strictly defined by a mathematical expression.

That is, in the image display device according to the present invention, when $\theta$ is an angle formed by the light flux of the image light immediately before incident on the combiner on an optical path of the image light that travels from the light guide to the plurality of combiners and then toward the eyes of the user after being reflected by a reflection surface of the combiner and a line perpendicular to the reflection surfaces of the plurality of combiners, A1 is a light flux width of the image light emitted from one emitting portion, and A2 is a light flux width of the image light emitted from all of the emitting portions, the separation distance between the plurality of combiners is set to fall within a range equal to or larger than $A1/(2 \cos \theta \cdot \tan \theta)$ and equal to or smaller than $A2/(2 \cos \theta \cdot \tan \theta)$ for any $\theta$.

Note that in the present invention, it may be configured such that when an axis parallel to a direction of a standard line of sight when a user views an image is defined as an x-axis, an axis perpendicular to the x-axis and parallel to a line connecting both eyes of the user is defined as a y-axis, and an axis perpendicular to the x-axis and the y-axis is defined as a z-axis,
  the light guide is arranged such that both the first surface and the second surface are parallel to an x-y plane, and the plurality of combiners is arranged to be perpendicular to an x-z plane and to be inclined at a predetermined angle with respect to the x-y plane.

In this configuration, the combiners are positioned above or below the light guide when viewed from the user.

In the present invention, the incident portion of the light guide is a reflection surface, such as, e.g., a mirror provided inside or on the surface of the substrate, or a holographic element, such as, e.g., a volume holographic diffraction grating. On the other hand, the plurality of emitting portions each are a partial reflection surface of, e.g., a beam splitter or a half mirror provided inside a substrate, or a holographic element, such as, e.g., a volume holographic diffraction grating, provided on the surface of the substrate.

In one aspect, it is assumed that the number of the emitting portions is two and the number of combiners is also two. In the present invention, the image light emitted from the image emitting unit and introduced into the substrate of the light guide is guided to the inside of the substrate by the incident portion. Then, the image light travels the inside of the substrate while being reflected between the first surface and the second surface opposed to each other, and reaches the first emitting portion which is a partial reflection surface. In this emitting portion, a part of the image light is reflected and taken out of the substrate. The remaining image light passes through the first emitting portion to reach the second emitting portion, and a part of the image light is reflected and taken out of the substrate, similar to the first emitting portion. The image light emitted from the light guide by the two emitting portions reaches the first combiner. A part of the image light is reflected by the partial reflection surface of the combiner towards the eyes of the user. The remainder thereof is transmitted through the combiner. The transmitted image light reaches the second combiner and is reflected by its partial reflection surface toward the eyes of the user.

Assuming that the two combiners are arranged above the light guide, the two combiners are arranged so that their upper ends are inclined toward the user. Therefore, in the image light emitted from the same emitting portion, the image by the image light reflected by the combiner positioned on the upper side toward the eyes of the user is positioned above the image by the image light reflected by the combiner positioned on the lower side toward the eyes of the user. Further, below the image by the image light emitted from the second emitting portion and reflected by the combiner positioned on the lower side toward the eyes of the user, the image by the image light emitted from the first emitting portion and reflected by the combiner positioned on the lower side toward the eyes of the user is positioned. Therefore, if a plurality of images formed by the image light that is emitted from the same emitting portion of the light guide, reflected by the different combiners, and reaches the eyes of the user, is superimposed with each other, there is a possibility that three systems of image light overlap in some regions, which leads to a large decrease in visibility. On the other hand, if a plurality of images formed by the image light that is emitted from the first emitting portion of the light guide, reflected by the combiner positioned on the upper side, and reaches the eyes of the user does not overlap an image formed by the image light that is emitted from the second emitting portion of the light guide, reflected by the combiner positioned on the lower side, and reaches the eyes of the user, and a gap is formed between both the images, there is a possibility that a horizontal strip-shaped image missing may occur in which no image is formed by any of image light.

On the other hand, in the present invention, the separation distance between two combiners is determined so that the above-described condition is satisfied. Therefore, there is no possibility that the image light of three systems overlaps in some regions and that there is no possibility that no horizontal strip-shaped image missing will be formed by any image light. This makes it possible to avoid excessive image overlap and image omission.

Effects of the Invention

According to the image display device of the present invention, it is possible to improve the visibility of an image displayed in front of eyes of a user while greatly enlarging a virtual image by using a light guide and a plurality of combiners.

EMBODIMENTS FOR CARRYING OUT THE INVENTION

An image display device, which is an embodiment of the present invention, will be described with reference to the attached drawings.

Figure 1:
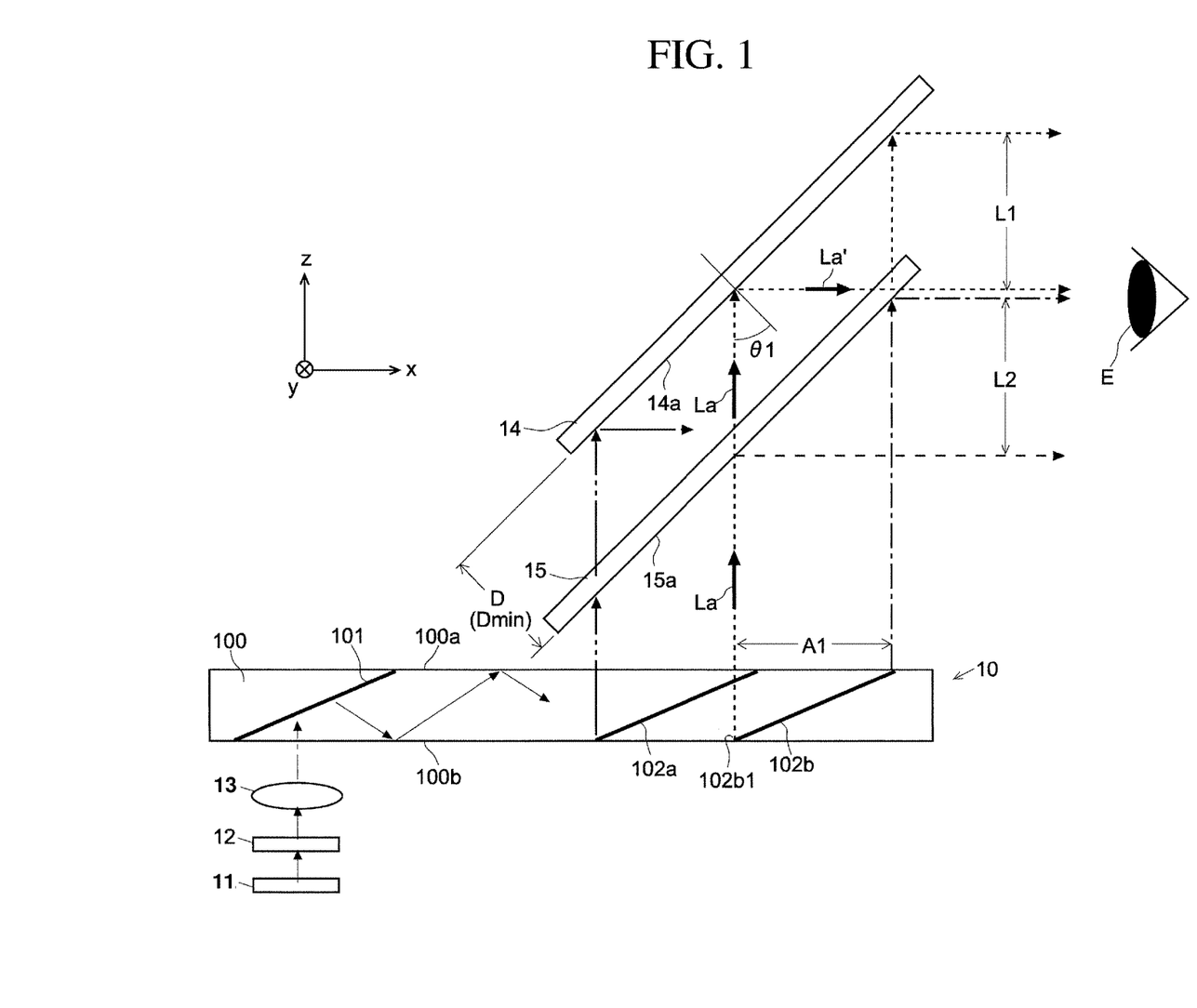
FIG. 1 is a schematic configuration diagram of an optical system in an image display device according to a first embodiment of the present invention.
Figure 2:
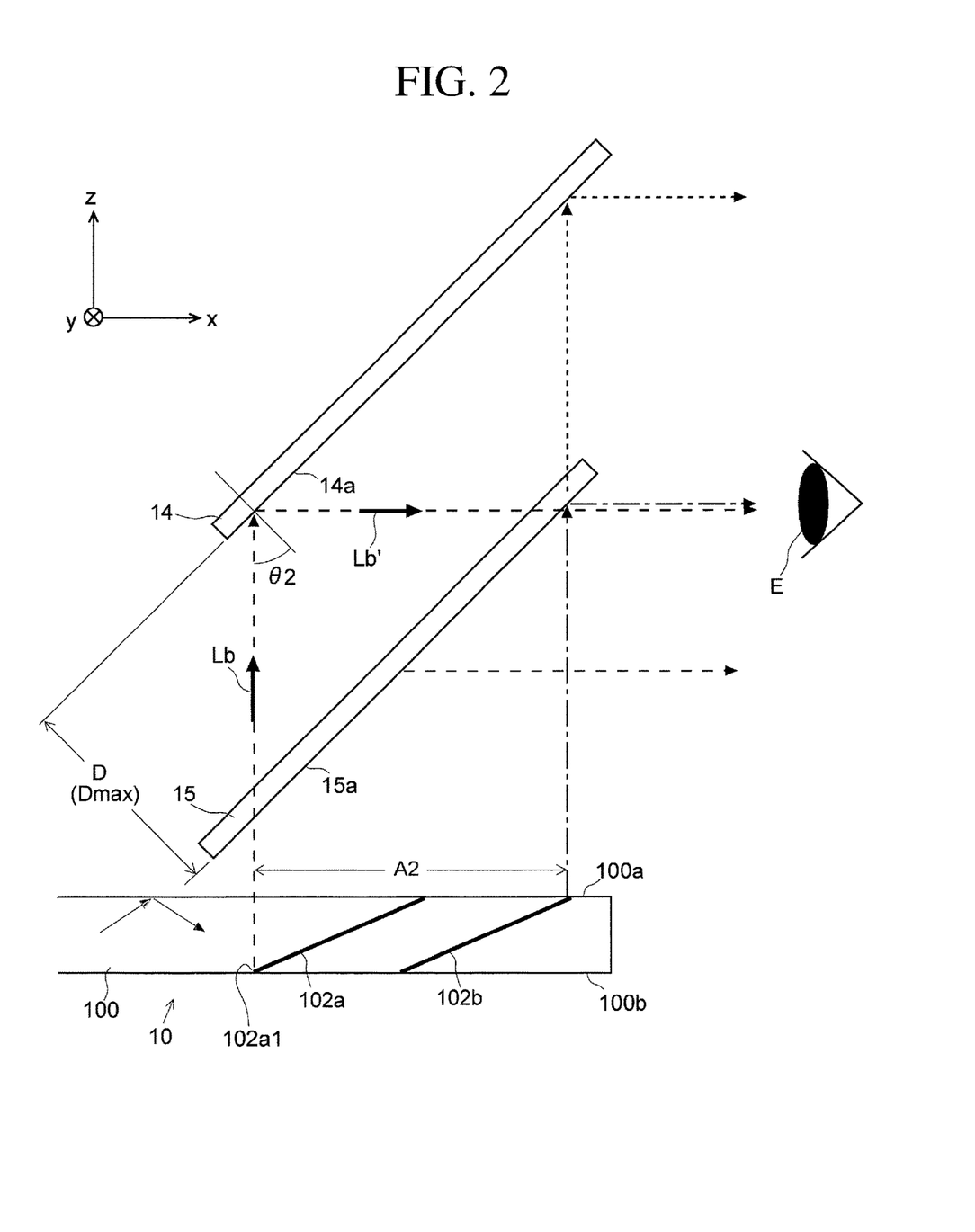
FIG. 2 is a schematic configuration diagram of an optical system in an image display device according to a second embodiment of the present invention.

FIG. 1 is a schematic configuration diagram of an optical system in an image display device of a first embodiment. FIG. 2 is a schematic configuration diagram of an optical system in an image display device of a second embodiment. Note that in FIG. 2, a part of the constituent components described in FIG. 1 is omitted. The image display device of the first embodiment and the image display device of the second embodiment are the same in the components, and only the separation distance between the two combiners, which will be described later, is different. Therefore, the configuration common to the first embodiment and the second embodiment will be described first.

The image display device of this embodiment is provided with a light source 11, a display element 12, a collimating optical system 13, a light guide 10, and two combiners 14 and 15. The light source 11, the display element 12, and the collimating optical system 13 correspond to the image emitting unit in the present invention. It is possible to use the same ones as the light source 21, the display element 22, the collimating optical system 23 in the conventional image display device shown in FIG. 5, but not limited thereto. For example, as the display element 12, instead of a transmissive liquid crystal display element, a reflective liquid crystal display element or an organic EL display, or a DMD (digital macro mirror device), a MEMS mirror, a projector, or the like, may be used.

In the case of using a reflective liquid crystal display element or a DMD as the display element 12, as the light source 11, a light source configured to illuminate the liquid crystal display element or the DMD from the front side thereof is used. Further, in the case of using a self-emitting display element, such as, e.g., an organic EL display, as the display element 12, it can be considered that the light source 11 is built in the display element 12. Further, in the case of using a MEMS mirror in which an angle is scanned as the display element 12, it may be configured to use a laser light source for emitting a thin laser beam toward the MEMS mirror as the light source 11 and the collimating optical system 13 is omitted or may be configured to use a collimating optical system 13 for the purpose of finely tuning the parallel light. Further, in the case of using a projector as the image forming unit, the light source 11 can be regarded as a projector, and the display element 12 can be regarded as a projector screen.

The light guide 10 is provided with a flat cube-shaped substrate 100 having a first surface 100a and a second surface 100b opposed in parallel to the x-y plane, and a third surface and a fourth surface (not shown) opposed in parallel to the x-z plane. The substrate 100 is a transparent member made of, for example, polycarbonate resin or quartz glass. A single incident-side reflection surface 101 and a plurality of (two in this embodiment) outgoing-side reflection surfaces 102a and 102b are formed inside the substrate 100.

The incident-side reflection surface 101 is perpendicular to the third surface and the fourth surface of the substrate 100 and is inclined with respect to the first surface 100a by a predetermined angle. Like the incident-side reflection surface 101, the two outgoing-side reflection surfaces 102a and 102b are perpendicular to the third surface and the fourth surface of the substrate 100 and are inclined with respect to the first surface 100a by a predetermined angle. In this embodiment, the incident-side reflection surface 101 is a reflection surface configured by a mirror or the like, and the outgoing-side reflection surfaces 102a and 102b each are a partial reflection surface having a predetermined reflectance.

The two flat-plate like combiners 14 and 15 are arranged side by side in the z-axis direction on the first surface 100a side of the light guide 10. These combiners 14 and 15 are perpendicular to the x-z plane and are inclined at a predetermined angle which is a sharp angle with respect to the x-y plane. That is, when viewed from the eyes E of the user, the combiners 14 and 15 are arranged such that the upper parts are inclined toward on the front side. The separation distance (distance between the partial reflection surfaces) of the partial reflection surfaces 14a and 15a of the two combiners 14 and 15 is "D".

In the image display device of this embodiment, the image light emitted from the display screen of the display element 12 that received the illumination light from the light source 11 is substantially collimated by the collimating optical system 13, passes through the second surface 100b, and is introduced to the inside of the substrate 100 of the light guide 10. The image light introduced from the collimating optical system 13 to the light guide 10 is a set of parallel light fluxes containing information of different portions of a two-dimensional image each formed on the display surface of the display element 12 and incident on the light guide 10 at different angles.

After being reflected by the incident-side reflection surface 101 inside the substrate 100, the image light is transmitted through the inside of the substrate 100 while being reflected by one or a plurality of times by the second surface 100b and the first surface 100a, and reaches the first outgoing-side reflection surface 102a. The outgoing-side reflection surface 102a reflects a part of the arrived light flux and transmits the remainder thereof. The transmitted light reaches the second outgoing-side reflection surface 102b and is reflected by the second outgoing-side reflection surface 102b. Therefore, the light flux transmitted through the substrate 100 of the light guide 10 is reflected by the two outgoing-side reflection surfaces 102a and 102b and is transmitted through the first surface 100a of the substrate 100 to be emitted substantially upward. As a result, the light flux introduced into the substrate 100 of the light guide 10 is expanded and emitted from the substrate 100.

The image light emitted from the light guide 10 is incident on the second combiner 15 positioned on the lower side, a part of the image light is reflected by the partial reflection surface 15a, and the remainder is transmitted. The transmitted image light is incident on the first combiner 14, and a part of the image light is reflected by the partial reflection surface 14a. The image light reflected by the respective combiners 14 and 15 travels towards the eyes E of the user. Thus, in front of the eyes E of the user, an image which is formed on the display surface of the display element 12 and enlarged is displayed as a virtual image.

Next, the configuration specific to each of the first embodiment and the second embodiment and the optical path for displaying the virtual image will be described.

[1] When Separation Distance D is the Smallest $D_{min}$

Figure 3:
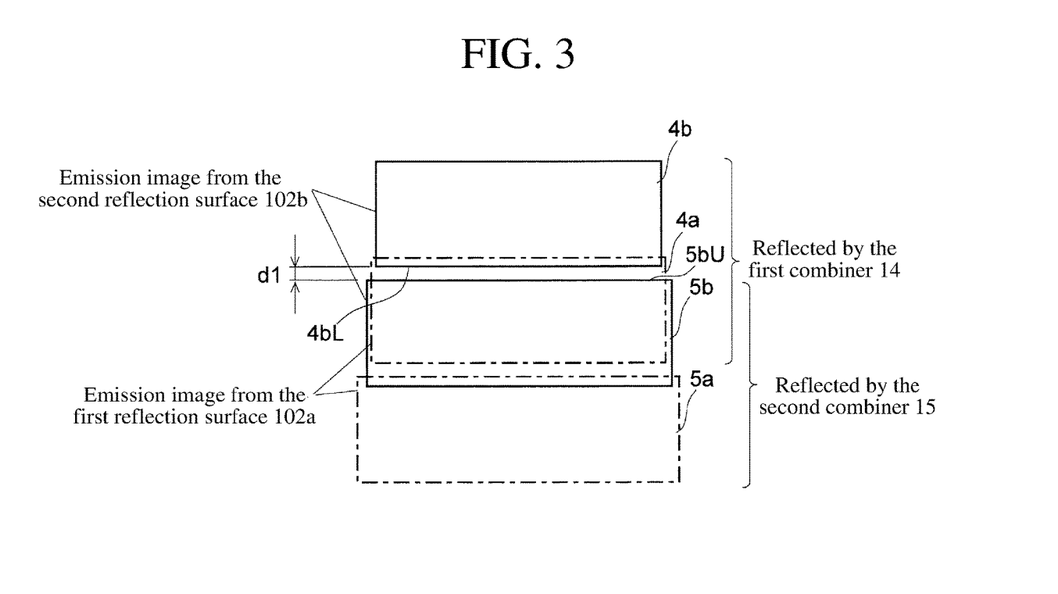
FIG. 3 is a schematic view of a display image by the image display device of the first embodiment as viewed from the user.

The image display device of the first embodiment shown in FIG. 1 has a configuration in which the separation distance D between the two combiners 14 and 15 is the smallest $D_{min}$. FIG. 3 is a schematic view showing images formed by the image light by the combination of two outgoing-side reflection surfaces 102a and 102b and two combiners 14 and 15 when the user views the combiners 14 and 15. Note that in this embodiment, as shown in FIG. 1 (and FIG. 2), it is assumed that the eyes E of the user generally face in the x-axis direction toward the partial reflection surfaces 14a and 15a of the combiners 14 and 15.

In this case, the axis of the light flux of the image light that travels from the light guide 10 toward the combiners 14 and 15, is reflected by the partial reflection surfaces 14a and 15a of the combiners 14 and 15, and travels towards the eyes E of the user is the light beam reflected by the end of the first outgoing-side reflection surface 102a in the second outgoing-side reflection surface 102b (light beam La in FIG. 1) and reflected by the partial reflection surface 14a of the upper combiner 14 (light beam La' in FIG. 1). Therefore, the angle formed by the line perpendicular to the partial reflection surface 14a of the combiner 14, 15 on the x-z plane and the light beam La is defined as an incident angle $\theta 1$ of the image light. This light beam is a light beam corresponding to the lower edge 4bL of the image 4b in FIG. 3.

Now, the light flux width of the image light reflected by one outgoing-side reflection surface 102a (or 102b) and emitted from the light guide 10 is defined as A1. A part of this image light in which the light flux width is A1 is reflected by the partial reflection surface 15a of the second combiner 15, and the remainder is transmitted through the second combiner 15 and is reflected by the partial reflection surface 14a of the first combiner 14. That is, the image light reflected by the same outgoing-side reflection surface 102b is reflected by the two combiners 15 and 14 toward the eyes E of the user.

When viewed from the user, the image formed by the image light reflected by the partial reflection surface 14a of the first combiner 14 positioned on the upper side (images 4b and 4a in FIG. 3) is positioned above the image formed by the image light reflected by the partial reflection surface 15a of the second combiner 15 positioned on the lower side (images 5b and 5a in FIG. 3). On the other hand, the image 4b formed by the image light in which the image light reflected by the second outgoing-side reflection surface 102b is reflected by the partial reflection surface 14a of the first combiner 14 is positioned above the image 4a formed by the image light in which the image light reflected by the first outgoing-side reflection surface 102a is reflected by the partial reflection surface 14a of the first combiner 14. Therefore, the four images 4b, 4a, 5b, and 5a formed by the image light by the combination of the two outgoing-side reflection surfaces 102a and 102b and the two combiners 14 and 15 are as shown in FIG. 3 when viewed from the user.

That is, when the separation distance D is $D_{min}$, the lower edge 4bL of the image 4b formed by the image light reflected by the second outgoing-side reflection surface 102b and reflected by the partial reflection surface 14a of the first combiner 14 is in contact with the upper edge 5bU of the image 5b formed by the image light reflected by the second outgoing-side reflection surface 102b and reflected by the partial reflection surface 15a of the second combiner 15, and the distance d1 between the lower edge 4bL on the upper side and the upper edge 5bU on the lower side becomes d1=0. That is, geometrically, it becomes $D_{min}=A1/(2 \cos\theta 1 \cdot \tan\theta 1)$. When the separation distance D is smaller than this, a portion of the lower end region of the image 4b formed by the image light reflected by the second outgoing-side reflection surface 102b and reflected by the partial reflection surface 14a of the first combiner 14 overlaps with a portion of the upper end region of the image 5b formed by the image light reflected by the second outgoing-side reflection surface 102b and reflected by the partial reflection surface 15a of the second combiner 15. Therefore, the images 4a, 4b, and 5b by the image light passed through the three different optical paths overlap at a part of the central region of the image, which causes sharply deteriorated visibility. On the other hand, if $d1 \geq 0$, there are only two overlapping images in the central region of the image, and therefore the deterioration in the visibility of the image is acceptable.

[2] When Separation Distance D is the Largest $D_{max}$

Figure 4:
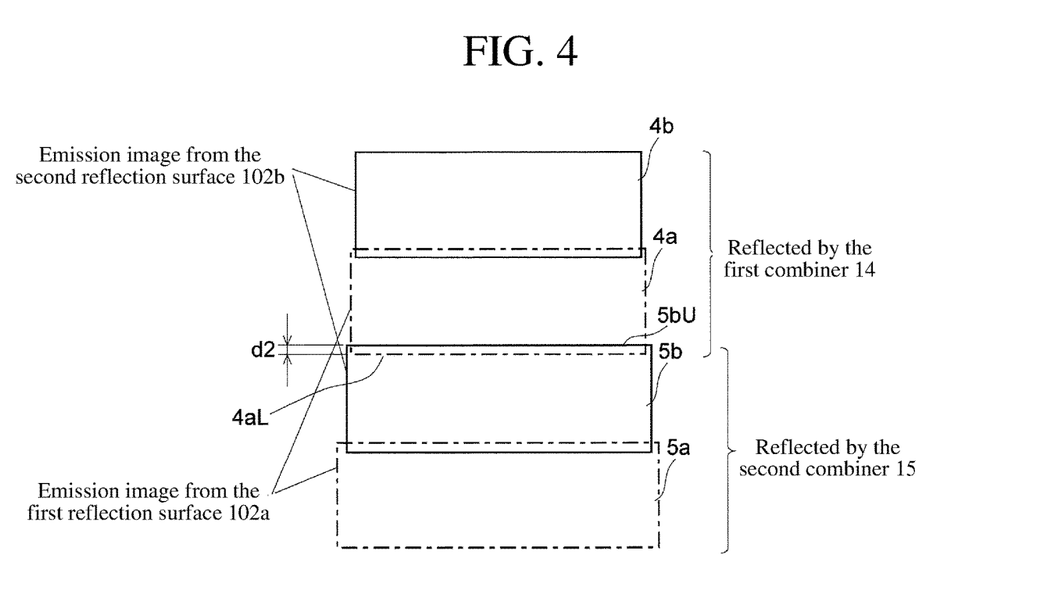
FIG. 4 is a schematic view of a display image by the image display device of the second embodiment as viewed from the user.

In the image display device of the second embodiment shown in FIG. 2, it is configured such that the separation distance D between the two combiners 14 and 15 is the largest $D_{max}$. FIG. 4 is a schematic view showing images formed by the image light by the combination of two outgoing-side reflection surfaces 102a and 102b and two combiners 14 and 15 when the user views the combiners 14 and 15. Here again, as shown in FIG. 1 (and FIG. 2), a situation is assumed in which the eyes E of the user generally face in the x-axis direction toward the partial reflection surfaces 14a and 15a of the combiners 14 and 15.

In this case, the axis of the light flux of the image light traveled from the light guide 10 toward the combiners 14 and 15 and reflected by the partial reflection surfaces 14a and 15a of the combiners 14 and 15 towards the eyes E of the user is the light beam reflected by the end of the first outgoing-side reflection surface 102a on the incident-side reflection surface 101 side (light beam Lb in FIG. 2) and reflected by the partial reflection surface 14a of the upper combiner 14 (light beam Lb' in FIG. 2). Therefore, the angle formed by the line perpendicular to the partial reflection surface 14a of the combiners 14 and 15 on the x-z plane and the light beam Lb is defined as an incident angle θ2. This light beam is a light beam corresponding to the lower edge 4aL of the image 4a in FIG. 4.

Here, the light flux width of the image light reflected by the entire two outgoing-side reflection surfaces 102a and 102b and emitted from the light guide 10 is denoted as A2. The part of this image light in which the light flux width is A2 is reflected by the partial reflection surface 15a of the second combiner 15, and the remainder transmits through the second combiner 15 and is reflected by the partial reflection surface 14a of the first combiner 14 toward the eyes E of the user. At this time, the four images 4b, 4a, 5b, and 5a formed by the image light by the combination of the two outgoing-side reflection surfaces 102a and 102b and the two combiners 14 and 15 are as shown in FIG. 4 when viewed from the user.

When the separation distance D is $D_{max}$, the lower edge 4aL of the image 4a formed by the image light reflected by the first outgoing-side reflection surface 102a and reflected by the partial reflection surface 14a of the first combiner 14 is in contact with the upper edge 5bU of the image 5b formed by the image light reflected by the second outgoing-side reflection surface 102b and reflected by the partial reflection surface 15a of the second combiner 15, and the gap d2 between the upper lower edge 4aL and the lower upper edge 5bU becomes d2=0. That is, geometrically, it becomes $D_{max}=A2(2\cos\theta2\cdot\tan\theta2)$. When the separation distance D is larger than this, a gap is formed between the lower edge 4aL of the image 4a formed by the image light reflected by the first outgoing-side reflection surface 102a and reflected by the partial reflection surface 14a of the first combiner 14 and the upper edge 5bU of the image 5b formed by the image light reflected by the second outgoing-side reflection surface 102b and reflected by the partial reflection surface 15a of the second combiner 15. Therefore, the image is interrupted in a band shape. On the other hand, when d2≥0, such an image interruption does not occur, and higher visibility can be ensured.

In the image display device of this embodiment as described above, the distance between the two combiners 14 and 15 (strictly, between the partial reflection surfaces 14a and 15a) is determined so as to fall within the range defined by the above condition. Therefore, it is possible to form an image capable of achieving sufficiently high visibility while enlarging the image light that has been propagated through the light guide 10.

Note that in the device of the above-described embodiment, the two combiners 14 and 15 are arranged above the light guide 10, but it is obvious that the configuration may be reversed. It is also obvious that the light guide 10 and the combiners 14 and 15 may be rotated about the x-axis while maintaining the positional relation thereof. Further, the incident angles θ1 and θ2 of the image light incident on the combiners 14 and 15 from the light guide 10 can also be appropriately determined under the condition that the reflected light is directed toward the eyes E of the user.

The light guide 10 is not limited to the above-described configuration, and can be variously modified in accordance with a well-known light guide configuration. For example, a reflective volumetric hologram grating or the like may be used as the incident portion and the emitting portion, and it may be configured such that the image light may be incident on the light guide in the oblique direction using the incident portion as a transmission surface. Further, the reflectance of the outgoing-side reflection surface of the emitting portion may be the same or may vary. Also, the third surface and the fourth surface of the substrate 100 need not be parallel to the x-z plane.

Further, the partial reflection surface 14a of the combiner 14 may be a surface opposite to the side on which the user is positioned. Similarly, the partial reflection surface 15a of the combiner 15 may be a surface opposite to the side on which the user is positioned.

Further, as apparent from the definitions of θ1 and θ2, the above-described incident angles θ1 and θ2 change when the position of the eyes E of the user is changed. Therefore, assuming the range of the positions of the eyes E of the user in advance, the incident angles θ1 and θ2 may be set and the optical design may be performed accordingly. For example, in the range of the position of the eyes E of the user, when the separation distance D is $D_{min}$, the incident angle may be set to the minimum incident angle θ1, and when the separation distance D is $D_{max}$, the incident angle may be set to the maximum incident angle θ2.

It should be noted that the above-described embodiments are mere examples of the present invention, and it is needless to say that they are encompassed within the scope of the claims of the present application even if it is appropriately changed, modified, or added within the scope of the present invention.

DESCRIPTION OF SYMBOLS

10: Light guide
100: Substrate
100a: First surface
100b: Second surface
101: Incident-side reflection surface
102a, 102b: Outgoing-side reflection surface
11: Light source unit
12: Display element
13: Collimating optical system
14: Combiner 1
15: Combiner 2
14a, 15a: Partial reflection surface

The invention claimed is:

1. An image display device for displaying a virtual image in front of eyes of a user, the image display device comprising:

a) an image emitting unit configured to cause parallel light fluxes to be incident on a light guide described below, the parallel light fluxes including two-dimensional image information different in an angle at each part on an image;
b) the light guide including a transparent substrate, an incident portion, and a plurality of emitting portions, wherein the transparent substrate has a first surface and a second surface opposed in parallel to each other, the incident portion is configured to guide image light incident from the image emitting unit to an inside of the substrate so as to be totally reflected by the first surface and the second surface, and the plurality of emitting portions is arranged along an overall propagation direction of the image light in the substrate to emit a part of the image light guided from the incident portion to an inside of the substrate and propagated in the substrate while being totally reflected by the first surface and the second surface to an outside of the substrate through either the first surface or the second surface; and
c) a plurality of flat plate-like combiners disposed at positions where the image light emitted from the plurality of emitting portions of the light guide reaches, the positions being in front of the eyes of the user, and the plurality of flat plate-like combiners being configured to reflect a part of the image light emitted from the plurality of emitting portions to guide the part of the image light to the eyes of the user,
wherein the plurality of combiners is arranged in parallel to each other so as to be spaced apart from each other in a traveling direction of the image light from the light guide, and
wherein a separation distance between the plurality of combiners is set to
fall within a range in which a plurality of images formed by the image light emitted from the same emitting portion of the light guide and reflected by combiners different from each other to reach the eyes of the user is not superimposed and that edges of a plurality of images formed by image light emitted from the different emitting portions of the light guide and reflected by the combiners different from each other to reach the eyes of the user coincide or parts of the plurality of images are superimposed, and
fall within a range equal to or larger than $A1/(2 \cos \theta \cdot \tan \theta)$ and equal to or smaller than $A2/(2 \cos \theta \cdot \tan \theta)$ for any $\theta$,
where $\theta$ is an angle formed by the light flux of the image light immediately before incident on the combiner on an optical path of the image light that travels from the light guide to the plurality of combiners and then toward the eyes of the user after being reflected by a reflection surface of the combiner and a line perpendicular to the reflection surfaces of the plurality of combiners,
A1 is a light flux width of the image light emitted from one emitting portion, and
A2 is a light flux width of the image light emitted from all of the emitting portions.

2. The image display device as recited in claim 1,
wherein when an axis parallel to a direction of a standard line of sight when a user views an image is defined as an x-axis, an axis perpendicular to the x-axis and parallel to a line connecting both eyes of the user is defined as a y-axis, and an axis perpendicular to the x-axis and the y-axis is defined as a z-axis,
the light guide is arranged such that both the first surface and the second surface are parallel to an x-y plane, and the plurality of combiners is arranged to be perpendicular to an x-z plane and to be inclined at a predetermined angle with respect to the x-y plane.

* * * * *